United States Patent [19]

Yokoyama

[11] Patent Number: 4,768,160

[45] Date of Patent: Aug. 30, 1988

[54] ARITHMETIC UNIT WITH SIMPLE OVERFLOW DETECTION SYSTEM

[75] Inventor: Yasushi Yokoyama, Tokyo, Japan

[73] Assignee: NEC Corporation, Tokyo, Japan

[21] Appl. No.: 852,278

[22] Filed: Apr. 15, 1986

[30] Foreign Application Priority Data

Apr. 16, 1985 [JP] Japan .................................. 60-80817

[51] Int. Cl.$^4$ .............................................. G06F 7/38
[52] U.S. Cl. ..................................... 364/745; 364/749
[58] Field of Search ................. 364/715, 737, 745, 749

[56] References Cited

U.S. PATENT DOCUMENTS 4,437,165   3/1984   Onodera .............................. 364/749

OTHER PUBLICATIONS

Rosenfeld, J. L., "Variable-Width Adder for Microprogrammed Computers Used for Emulation", *IBM Technical Disclosure Bulletin*, vol. 15, #4, pp. 1149–1150, Sep. 1972.

Arithmetic Operations in Digital Computers, R. K. Richards, Van Nostrand Co., Inc., 1955, pp. 81–135.

The Logic of Computer Arithmetic, Ivan Flores, Prentice-Hall Inc., pp. 70–83.

Digital Computer Design, Edward L. Braun, Academic Press, 1963, pp. 266–371.

*Primary Examiner*—Gary V. Harkcom
*Assistant Examiner*—Dale M. Shaw
*Attorney, Agent, or Firm*—Sughrue, Mion, Zinn, Macpeak, and Seas

[57] ABSTRACT

An arithmetic unit with a simple overflow detection system performs arithmetic operations between first and second data. The first data is exclusively divided into a fixed value portion and a variable portion, whose digit position is lower than that of the fixed value portion. The ratio of a length of the fixed value portion to that of the variable portion in the first data varies. The second data corresponds only to the variable portion of the first data. The arithmetic unit includes an adder for adding the first and second data in their entire lengths, a switch circuit for separating output data from the first data and the adder into fixed value and variable portions, a comparator for comparing the fixed value portions of the outputs from the first data and the adder and outputting a coincidence or noncoincidence signal, an output register for linking the fixed value portion of the first data and the variable portion of the output from the adder and outputting the linked data, and an overflow detector for detecting an overflow in response to the noncoincidence signal from the comparator.

3 Claims, 3 Drawing Sheets

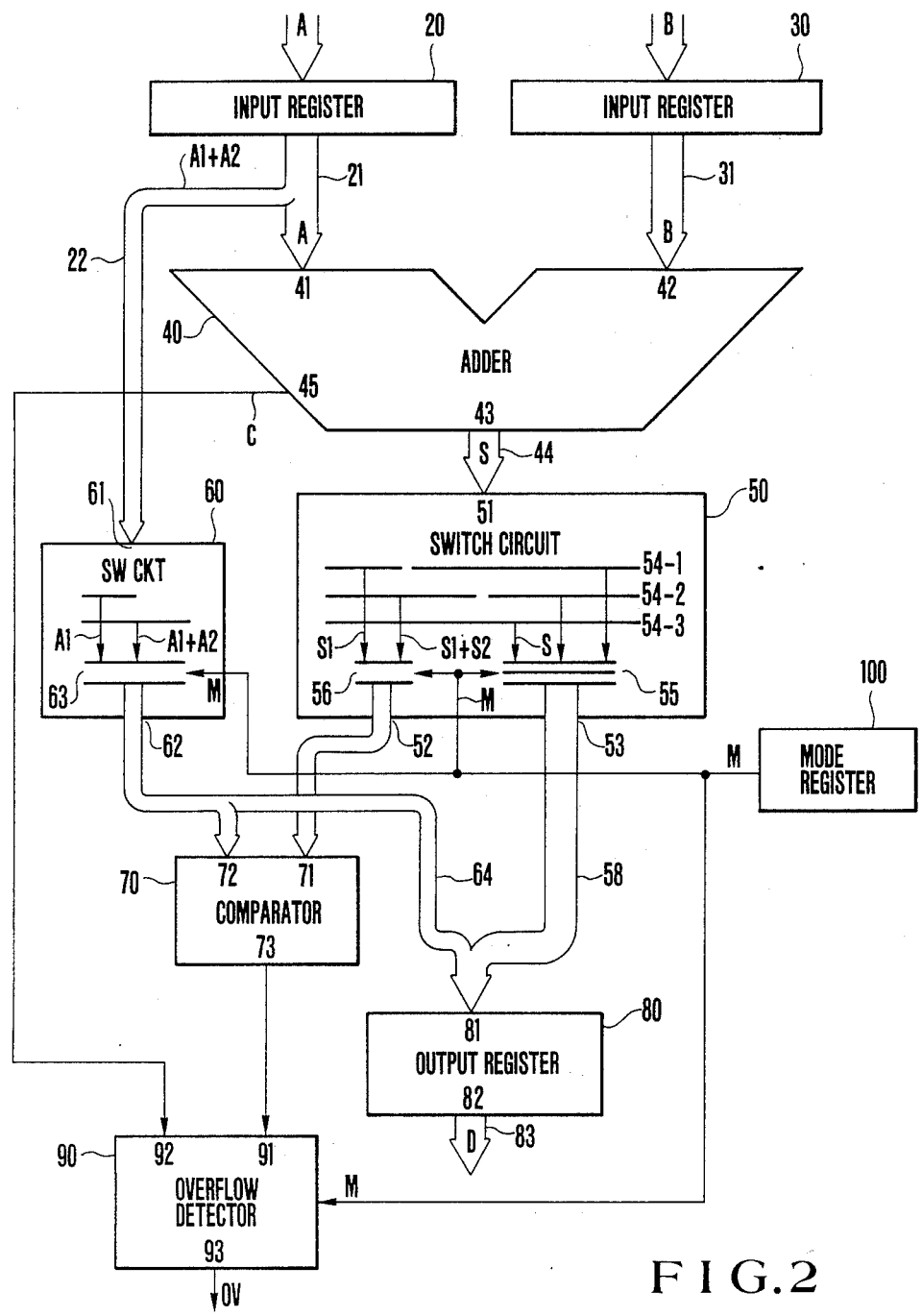
F I G. 2

ARITHMETIC UNIT WITH SIMPLE OVERFLOW DETECTION SYSTEM

BACKGROUND OF THE INVENTION

The present invention relates to an arithmetic unit with a simple overflow detection system and, more particularly, to an arithmetic unit for performing arithmetic operations between first and second data in a fixed and floating decimal point operations and a logical address operation of a computer employing virtual memory system. The first data is exclusively divided into a fixed value portion and a variable portion whose digit position is lower than that of the fixed value portion. The digits contained in the fixed value portion and the variable portion are fixed and variable, respectively. The ratio of a length of the fixed value portion to that of the variable portion in the first data varies.

A typical conventional arithmetic unit of this type is illustrated in FIG. 1. First data has a 32-bit length and consists of mode 1 data, mode 2 data, and mode 3 data. The mode 1 data consists of an 8-bit fixed value portion and a 24-bit variable portion. The mode 2 data consists of 16-bit fixed value and variable portions. The mode 3 data consists of only a 32-bit variable portion. Second data consists of a variable portion, the bit length of which is the same as that of the variable portion of the first data. The arithmetic unit of FIG. 1 includes: a mode register 1 for outputting a mode signal corresponding to an externally designated data mode; input registers 2 and 3 for storing the first and second data and outputting them in response to an addition instruction; an adder 4 for adding output data A1 and B1 of the upper eight bits from the input registers 2 and 3; an adder 5 for adding data A2 and B2 of lower 8 bits of data A1 and B1 of the input registers 2 and 3; an adder 6 for adding data A3 and B3 of the lowest 16 bits from the input registers 2 and 3; a switch circuit 7 for supplying data zero ("0") to the adder 4 when the mode signal from the mode register 1 represents mode 1 or 2, and the data B1 from the input register 3 to the adder 4 when the mode signal represents mode 3; a switch circuit 8 for supplying data "0" to the adder 5 when the mode signal represents mode 2, and the data B2 from the input register 3 to the adder 5 when the mode signal represents mode 1 or 3; a switch circuit 9 for outputting a carry signal C2, C3, or C1 from the adder 5, 6, or 4 when the mode signal represents mode 1, 2, or 3; a carry cutoff circuit 10 for inhibiting the supply of the carry signal C2 from the adder 5 to the adder 4 when the mode signal represents mode 1; a carry cutoff circuit 11 for inhibiting the supply of the carry signal C3 from the adder 6 to the adder 5 when the mode signal represents mode 2; and an output register 12 for linking the outputs from the adders 4, 5, and 6 and outputting the sum as an arithmetic operation result.

With the arrangement described above, a plurality of adders of different, short bit lengths must be used to correspond with the bit lengths of the fixed value and variable portions of different types of input data. In carry lookahead control, carry delay times for carry matching of the respective adders are increased. These adders and the carry cutoff circuits complicate the circuit arrangement of the conventional arithmetic and logic unit.

SUMMARY OF THE INVENTION

It is an object of the present invention to provide an arithmetic unit, wherein the conventional drawbacks can be eliminated, a plurality of special adders of different bit lengths and carry cutoff circuits need not be used, simplifying the circuit arrangement, and a carry delay time can be reduced.

In order to achieve the above object of the present invention, there is provided an arithmetic unit with a simple overflow detection system, the arithmetic unit being arranged to perform arithmetic operations between first and second data, the first data being exclusively divided into a fixed value portion and a variable portion whose digit position is lower than that of the fixed value portion, a ratio of a length of the fixed value portion to that of the variable portion in the first data being adapted to vary, the second data being adapted to correspond to only the variable portion of the first data, comprising: a mode register for outputting a mode signal which represents the ratio and is externally supplied in advance; first and second input registers for receiving and storing first and second data; an adder for adding output data from the first and second input registers in entire lengths thereof; switch means supplied with the mode signal for separating the output data from the first input register and the adder into a fixed value portion and a variable portion, respectively, and for outputting the fixed value portions and the variable portions; a comparator for comparing the fixed value portion of the output from the first input register with the fixed value portion of the output from the adder, and for outputting a coincidence or noncoincidence signal therefor; an output register for linking the fixed value portion of the output from the first input register with the variable portion of the output from the adder, and for outputting linked data as an arithmetic operation result; and an overflow detector for detecting an overflow of a sum of the variable portions of the first and second data in response to the noncoincidence signal from the comparator.

BRIEF DESCRIPTION OF THE DRAWINGS

FIG. 2 is a block diagram of an arithmetic unit according to an embodiment of the present invention.

DETAILED DESCRIPTION OF THE PREFERRED EMBODIMENT

Figure 1:
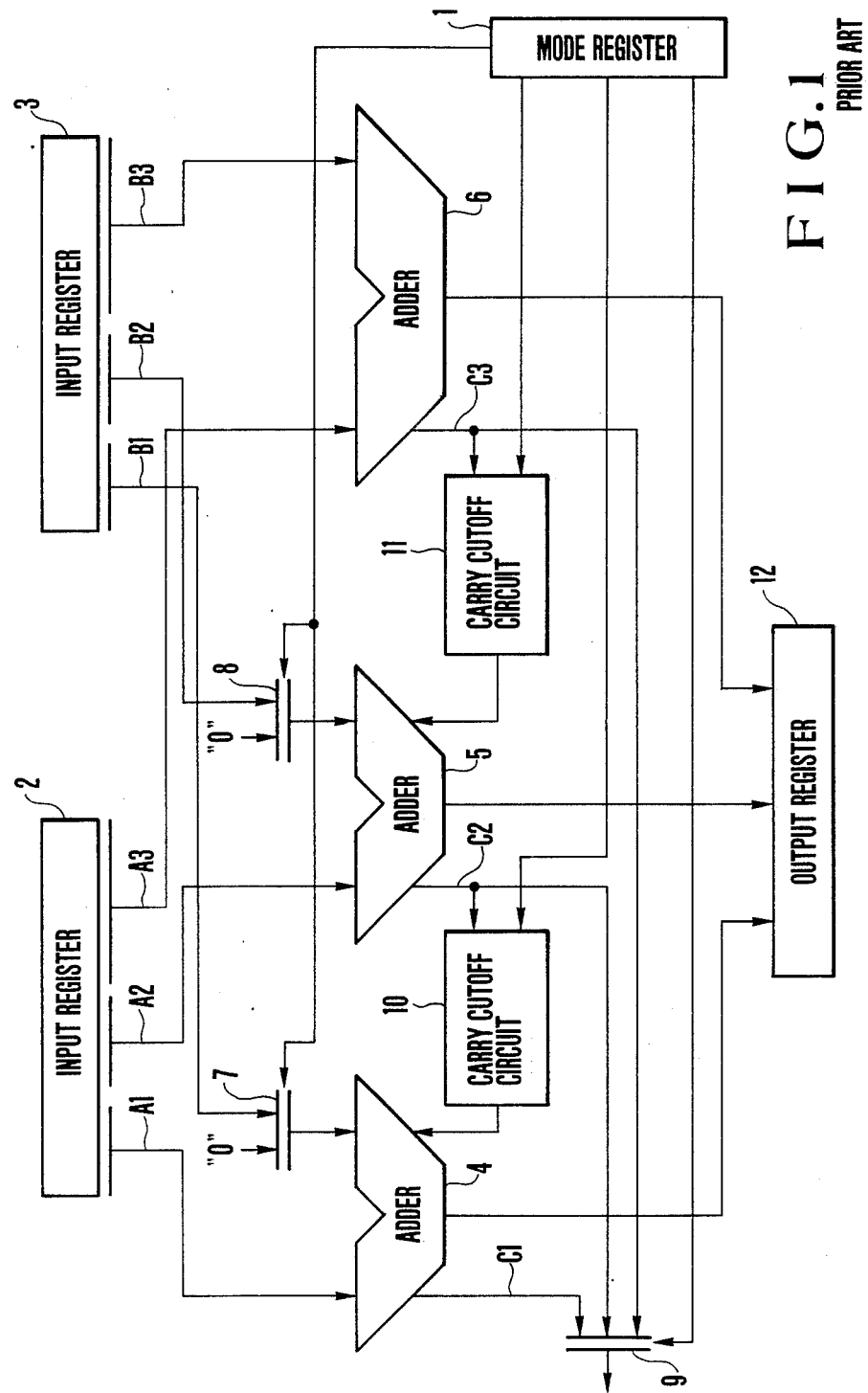
FIG. 1 is a block diagram of a conventional arithmetic unit.

A preferred embodiment of the present invention will be described with reference to the accompanying drawings. FIG. 2 is a block diagram of an arithmetic unit according to an embodiment of the present invention. Referring to FIG. 2, input registers 20 and 30 receive and store input data A and B to be operated. The input data A is 32-bit data consisting of a fixed value portion and a variable portion, the digit position of which is lower than that of the fixed value portion. The input data A can be mode 1 data consisting of an 8-bit fixed value portion and a 24-bit variable portion, mode 2 data consisting of 16-bit fixed value and variable portions, or mode 3 data consisting of only a 32-bit variable portion. Data B is variable data having a bit length equal to that of the variable portion of the data A. The mode of the input data A and B are preset in a mode register 100 prior to an arithmetic operation. The input registers 20 and 30 are connected to input terminals 41 and 42 of an adder 40 through 32-bit data buses 21 and 31. The adder 40 adds the 32-bit data input to the input terminals 41 and 42. Sum data S appears at an output terminal 43 of the adder 40, and is sent onto a data bus 44. The data bus 44 is connected to an input terminal 51 of a switch circuit 50 (to be described in detail later).

Upper 16-bit lines 22 of the data bus 21 of the input register 20 are branched from the data bus 21 and connected to an input terminal 61 of a switch circuit 60.

Symbols in the blocks of the switch circuits 50 and 60 represent connections between input and output terminals according to the data modes in the following manner. In the switch circuit 50, discrete lines 54-1 and 54-2, and a continuous line 54-3 show bit structures of input data S to the input terminal 51 in the modes 1, 2, and 3. If upper 8-bit data of the input data S is S1 and its lower 8-bit data is S2, in the same manner as in the data A, the data S consists of an 8-bit fixed value portion S1 and a 24-bit variable portion in the mode 1 (the line 54-1). In the mode 2, the data S consists of a 16-bit fixed value portion S1+S2 and a 16-bit variable portion (the line 54-2). In the mode 3, the data S consists of only the 32-bit variable portion (the line 54-3).

In the switch circuit 50, reference numeral 55 denotes a switch for extracting the variable portion of the signal S corresponding to a mode signal M from the mode register 100, and for connecting the extracted variable portion to an output terminal 53; and 56, a switch for extracting the fixed value portion of the signal S corresponding to the mode signal M, and for connecting the extracted fixed value portion to an output terminal 52. Since no fixed value portion is present in the mode 3, the switch 56 supplies S1 or S1+S2 to the output terminal 52. The switch circuit 60 is arranged in the same manner as the switch circuit 50. In the switch circuit 60, 8-bit data A1 or 16-bit data A1+A2 of the data input to the input terminal 61 appears at an output terminal 62 in response to the mode signal M.

The output terminal 52 and an output terminal 62 of the switch circuits 50 and 60 are connected to input terminals 71 and 72 of a comparator 70. The comparator 70 compares the data input to the terminal 71 with that to the terminal 72, and outputs a coincidence or noncoincidence signal from an output terminal 73. The comparator 70 compares an output from a switch 63 in the switch circuit 60 with an output from the switch 56 in the switch circuit 50 (the functions of the switches 50 and 60 have been described above). The comparator 70 compares the fixed value portion of the sum S with the fixed value portion of the data A changing in response to the mode 1 or 2. Since the data A (32-bit data) is added to data B (32-bit data), when an overflow occurs in the sum of the variable portions of the data A and B, a carry occurs into the fixed value portion. As a result, the fixed value portion of the sum S is different from that of the data A. Therefore, the overflow can be detected in response to the noncoincidence signal from the comparator 70.

The output terminal 62 of the switch circuit 60 is connected to the upper 16-bits of an input terminal (32 bits) 81 of an output register 80 through a data bus 64.

The output terminal 53 of the switch circuit 50 is connected to the input terminal 81 of the output register 80 through a data bus 58. An output terminal 82 of the output register 80 is connected to a data bus 83 for outputting the arithmetic operation result.

The output terminal 73 of the comparator 70 is connected to an input terminal 91 of an overflow detector 90. An input terminal 92 of the overflow detector 90 is connected to a carry output terminal 45 of the adder 40. The mode signal M is supplied from the mode register 100 to the overflow detector 90. The overflow detector 90 outputs an overflow signal OV corresponding to the mode represented by the mode signal M.

The operations of the arithmetic unit of FIG. 2 will now be described for the modes 1, 2, and 3.

(1) Mode 1

The fixed value portion of the data A is the upper 8-bit data A1, and the variable portion thereof is the lower 24-bit data. The data B (consisting of only the variable portion) is 24-bit data.

Figure 3A:
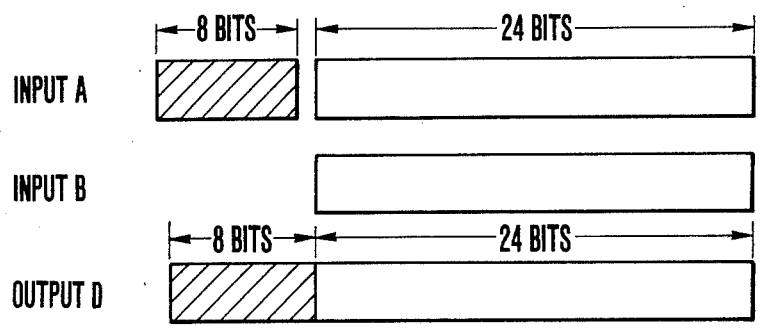
FIGS. 3A to 3C are charts for explaining the relationship between the input and output data with respect to the arithmetic unit of FIG. 2.
Figure 3B:
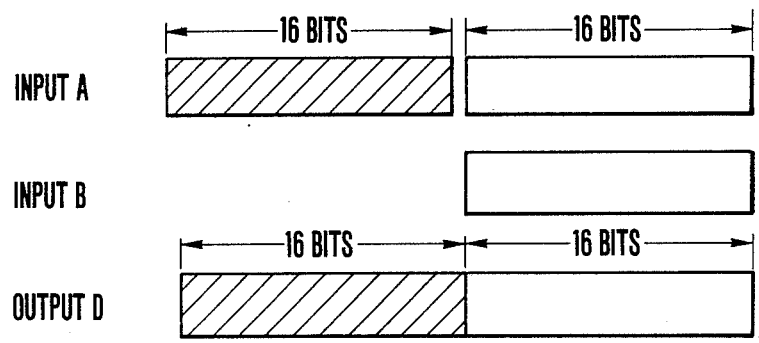
Figure 3C:
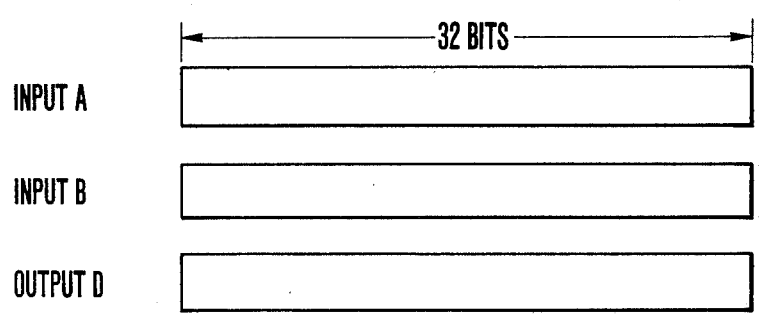

In this case, the comparator 70 receives the upper 8-bit data A1 of the data A and the upper 8-bit data S1 of the sum S. Since the data B does not have bits corresponding to the upper 8-bit data A1 (i.e., the fixed value portion) of the data A, A1 is equal to S1 if no overflow occurs in the sum of the variable portions of the data A and B. However, if an overflow occurs, the comparator 70 generates a noncoincidence signal. In response to this signal, the overflow detector 90 generates the overflow signal OV. The upper 8-bit and lower 24-bit lines of the output register 80 exclusively receive the data A1 and the lower 24-bit data of the sum S, respectively. As a result, the sum S shown in FIG. 3A is obtained.

(2) Mode 2

The fixed value portion of the data A is upper 16-bit data (i.e., A1+A2), and the variable portion of the data A is lower 16-bit data (i.e., A-A1-A2=A3). The variable portion of the data B is 16-bit data.

The comparator 70 receives the upper 16-bit data (A1+A2) of the data A and the upper 16-bit data (S1+S2) of the sum S. In this case, in the same manner as for the mode 1, the overflow is detected by the noncoincidence signal from the comparator 70 on the basis of the sum of the variable portions of the data A and B. The output register 80 outputs a signal, the upper 16-bit data of which is A1+A2 and the lower 16-bit data of which is the lower 16-bit data of the sum S.

(3) Mode 3

The data A does not have a fixed value portion but consists of only the 32-bit variable portion. So does the data B.

In this case, the overflow detector 90 does not receive the output from the comparator 70 in response to the mode signal representing the mode 3, but receives a carry signal C from the carry output terminal 45 of the adder 40 and outputs it as the overflow signal OV. The output register 80 outputs the sum S (32-bit data) without modification.

According to the present invention as described in detail, a full-width adder can be used, and carry cutoff circuits can be omitted. The hardware configuration can thus be simplified, resulting in low cost. In addition, since the bit width controlled by the carry lookahead can be increased, the carry delay time is shortened. Therefore a high-speed arithmetic unit can be provided.

What is claimed is:
1. An arithmetic unit with an overflow detection system, said arithmetic unit being arranged to perform arithmetic operations between first and second data, the first data being exclusively divided into a fixed value portion and a variable value portion whose digit position is lower than that of the fixed value portion, a ratio of a length of the fixed value portion to that of the variable value portion in the first data being variable, the second data being made up of only the variable value portion corresponding to the variable value portion of the first data, comprising: a mode register for outputting a mode signal which represents the ratio and which is externally supplied in advance; first and second input registers for receiving and storing the first and second data; an adder for adding output data from said first and second input registers in entire lengths thereof: switch means for extracting fixed value portions of both the first data and the output data from said adder such that both fixed value portions extracted by said extracting means have the same length determined according to the mode signal; a comparator for comparing the fixed value portion of the output from said first input register with the fixed value portion of the output from said adder, and outputting aa coincidence or noncoincidence signal therefor; an output register for linking the fixed value portion of the output from said first input register with the variable portion of the output from said adder, and outputting linked data as an arithmetic operation result; and an overflow detector for detecting an overflow of a sum of the variable portions of the first and second data in response to the noncoincidence signal from said comparator.

2. A unit according to claim 1, wherein the first data includes data consisting of only the variable portion, and said overflow detector detects the overflow by the noncoincidence signal from said comparator or a carry from said adder in response to the mode signal.

3. A unit according to claim 1, wherein said switch means includes a first switch for separating the output from said adder into fixed value and variable portions in accordance with the mode signal; and a second switch for receiving upper bits of a maximum bit length attributed to the fixed value portion of the first data during output of said first register, and for outputting the fixed value portion of the first data in accordance with the mode signal.

* * * * *